United States Patent [19]

Heck et al.

[11] Patent Number: 5,301,217
[45] Date of Patent: Apr. 5, 1994

[54] DEVICE FOR THE RECOMBINATION OF HYDROGEN AND OXYGEN AND NUCLEAR POWER PLANT USING THE DEVICE

[75] Inventors: Reinhard Heck; Karl-Heinz Schwenk, both of Hanau, Fed. Rep. of Germany

[73] Assignee: Siemens Aktiengesellschaft, Munich, Fed. Rep. of Germany

[21] Appl. No.: 975,528

[22] Filed: Nov. 12, 1992

[30] Foreign Application Priority Data

May 11, 1990 [DE] Fed. Rep. of Germany ....... 4015228

[51] Int. Cl.$^5$ .............................................. G21C 9/06
[52] U.S. Cl. .................................. 376/301; 423/580.1
[58] Field of Search ................. 376/301, 300; 423/580

[56] References Cited

U.S. PATENT DOCUMENTS

| 4,126,667 | 11/1978 | Butler et al. | 423/580 |
| 4,471,014 | 9/1984 | den Hartog et al. | 423/580 |

FOREIGN PATENT DOCUMENTS

| 233564 | 8/1987 | European Pat. Off. |
| 0301536 | 2/1989 | European Pat. Off. |
| 303144 | 2/1989 | European Pat. Off. |
| 2239952 | 4/1973 | Fed. Rep. of Germany |
| 3004677 | 8/1981 | Fed. Rep. of Germany |
| 3143989 | 2/1983 | Fed. Rep. of Germany |
| 3816711 | 5/1988 | Fed. Rep. of Germany |
| 9000830 | 5/1990 | Fed. Rep. of Germany |
| 52-75657 | 6/1977 | Japan |

OTHER PUBLICATIONS

Siemens Publication Order No. A19100-U822-A107 May 1988, "Wasserstoffzünder WZK 88".

Primary Examiner—Daniel D. Wasil
Attorney, Agent, or Firm—Herbert L. Lerner; Laurence A. Greenberg

[57] ABSTRACT

A device for the recombination of hydrogen and oxygen includes catalyst bodies having surfaces and a catalytic coating on the surfaces over which a gas and vapor mixture containing hydrogen to be eliminated is to be conducted. A casing which surrounds and retains the catalyst bodies has at least one permanently open gas inlet aperture and one permanently open gas outlet aperture, and a gas flow path in the casing through which the apertures communicate. The catalyst bodies are disposed downstream of the gas inlet aperture in the gas flow path. The catalyst bodies are flat bodies formed of multi-layered sheet metal in a multi-channel configuration forming a plurality of mutually parallel gas flow channels. Some of the gas flow channels have channel cross sections being defined by at least an adjacent two of the flat bodies being spaced-apart, and the gas flow channels at ends of the configuration have channel cross sections being defined by at least one of the flat bodies. The flat bodies each have a metal support sheet, a porous adhesion-promoting surface structure of the support sheet with a thickness of less than 10 µm, a porous intermediate layer, preferably of AlO$_3$, applied to the surface structure for increasing surface area, and a catalyst coating of platinum or palladium being applied to the intermediate layer and distributed finely enough to preserve porosity of the intermediate layer.

40 Claims, 6 Drawing Sheets

FIG.5
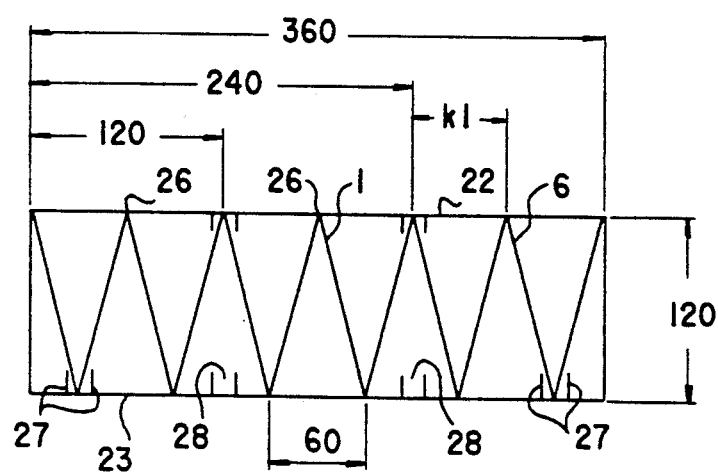
FIG.6
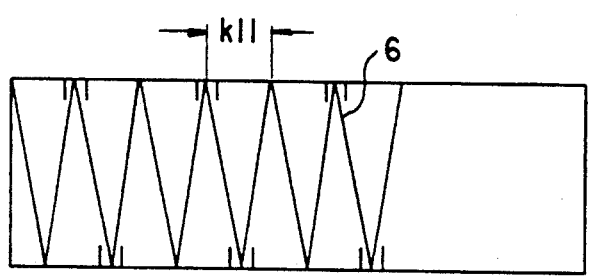
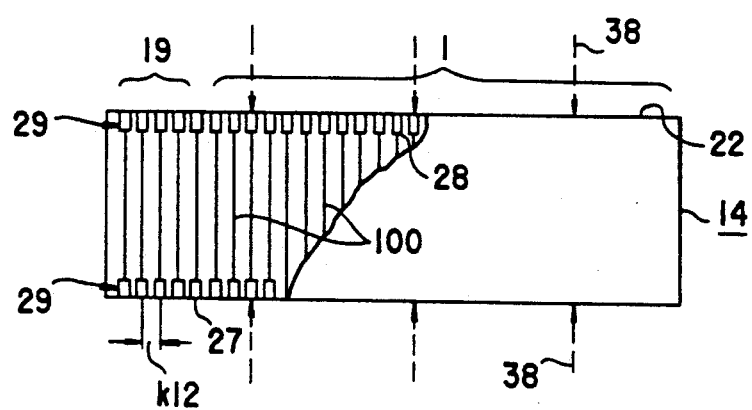
FIG.7

| 1 | 2 | 3 | 4 | 5 |
|---|---|---|---|---|
| TIME (min) | $C_{H_2}$ (VOL.-%) | $V_{H_2}$ (l/min) | $C_{H_2}$ (VOL.-%) | $V_{GAS}$ (l/min) |
| 0 | 2.10 | | | |
| | | 0.175 | 1.925 | 9.09 |
| 1 | 1.75 | | | |
| | | 0.175 | 1.575 | 11.11 |
| 2 | 1.40 | | | |
| | | 0.150 | 1.250 | 12.00 |
| 3 | 1.10 | | | |
| | | 0.125 | 0.975 | 12.82 |
| 4 | 0.85 | | | |
| | | 0.075 | 0.775 | 9.68 |
| 5 | 0.70 | | | |
| | | 0.050 | 0.650 | 7.69 |
| 6 | 0.60 | | | |
| | | 0.050 | 0.550 | 9.09 |
| 7 | 0.50 | | | |

| TEST NUMBER | FOLD DISTANCE | CAT. HEIGHT | SHAFT HEIGHT | CORR. TIME | T-MAX SHAFT | T-MAX CAT. | RELATIVE CAT. AREA |
|---|---|---|---|---|---|---|---|
| V 1.1.1 | 60mm | 75mm | 400mm | 31.33min | 80°C | 436°C | 1 |
| V 1.1.2 | 60mm | 75mm | 600mm | 30.00min | 70°C | 436°C | 1 |
| V 1.1.3 | 60mm | 75mm | 800mm | 29.00min | 68°C | 408°C | 1 |
| V 2.1.1 | 40mm | 75mm | 400mm | 20.00min | 66°C | 440°C | 1,5 |
| V 2.1.1 a | 40mm | 75mm | 400mm | 20.22min | 124°C | 496°C | 1,5 |
| V 2.2.1 | 40mm | 150mm | 400mm | 13.11min | 98°C | 280°C | 3 |
| V 2.2.1 a | 40mm | 150mm | 400mm | 10.98min | 130°C | 444°C | 3 |
| V 2.2.1 b | 40mm | 150mm | 400mm | 10.89min | 154°C | 438°C | 3 |
| V 2.3.1 | 40mm | 225mm | 400mm | 12.22min | 182°C | 468°C | 4,5 |
| V 2.3.1 a | 40mm | 225mm | 400mm | 8.89min | 160°C | 476°C | 4,5 |
| V 2.3.3 | 40mm | 225mm | 800mm | 6.67min | 142°C | 426°C | 4,5 |
| V 3.1.1 | 20mm | 75mm | 400mm | 11.67min | 104°C | 484°C | 3 |
| V 3.1.3 | 20mm | 75mm | 800mm | 9.11min | 145°C | 428°C | 3 |
| V 3.2.1 | 20mm | 150mm | 400mm | 7.11min | 188°C | 500°C | 6 |
| V 3.2.1 a | 20mm | 150mm | 400mm | 7.11min | 196°C | 528°C | 6 |
| V 3.2.3 | 20mm | 150 mm | 800mm | 5.33min | 172°C | 434°C | 6 |
| V 3.3.1 | 20mm | 225mm | 400mm | 7.56min | 196°C | 474°C | 9 |

FIG.11

DEVICE FOR THE RECOMBINATION OF HYDROGEN AND OXYGEN AND NUCLEAR POWER PLANT USING THE DEVICE

CROSS-REFERENCE TO RELATED APPLICATION

This application is a continuation of International Application Serial No. PCT/DE91/00379, filed May 9, 1991.

The invention relates to a device for recombining hydrogen and oxygen with the aid of catalyst bodies which have a catalytic coating on their surface, over which a gas and vapor mixture containing the hydrogen to be eliminated, can be conducted, the device has a casing that surrounds and holds the catalyst body.

Such a device is known from Published European Application No. 0 303 144 A1 (1), corresponding to U.S. Pat. No. 4,911,879. In it, a catalyst body is disposed in a vertically extending tube, which is spaced apart from the inside wall of the tube. The end surfaces of the tube are provided with caps that open as a function of pressure and/or temperature. Palladium or platinum is used in particular as the catalyst material, and recombination already occurs in the range of non-ignitable hydrogen concentrations. Although such an ignition process is known as "cold ignition", heating does already take place. It is substantially less than in the case of so-called torching off, or in other words open combustion, as is described, for instance, in German Published, Non-Prosecuted Application DE 30 04 677 A1 (2). By comparison, a device of that generic type for recombining hydrogen and oxygen has the advantage of avoiding open combustion and random gas clouds even if catalytic ignition (accordingly, not only "cold ignition") takes place, or in other words an ignitable $H_2$ concentration in the inflowing gas and vapor mixture that leads to internal ignition. With that known device, which is also known as a "Wasserstoffzünder WZK 88" [WZK 88 Hydrogen Igniter], seen in the Siemens Publication Order No. A19100-U822-A107, May 1988 (3a), only relatively small quantitative flows can be subjected to recombination by so-called cold ignition. Moreover, because of its caps that open as a function of pressure and/or temperature, that known device does not communicate permanently with the containment atmosphere in a nuclear power plant or the atmosphere of a nuclear laboratory or other facility where hydrogen can be produced. Accordingly, it may be that the device may already be in operation once an $H_2$ concentration below the ignition limit of 3 volume %, for instance, is attained. However, its caps are still closed because the tripping limit values of pressure or temperature have not yet been attained. It is not until the limit values are attained that the caps open and the device begins recombination.

It is accordingly an object of the invention to provide a device for the recombination of hydrogen and oxygen and a nuclear power plant using the device, which overcome the hereinafore-mentioned disadvantages of the heretofore-known devices of this general type and, while taking the known device for recombining hydrogen and water of reference (1) as the point of departure, to construct the device in such a way that it is permanently available for recombination processes, so that caps that open as a function of pressure and/or temperature are not needed to put it into operation, and substantially larger quantiative flows of the gas and vapor mixture can be processed.

With the foregoing and other objects in view there is provided, in accordance with the invention, a device for the recombination of hydrogen and oxygen, comprising catalyst bodies having surfaces and a catalytic coating on the surfaces over which a gas and vapor mixture containing hydrogen to be eliminated is to be conducted; a casing surrounding and retaining the catalyst bodies, the casing each having at least one permanently open gas inlet aperture and one permanently open gas outlet aperture, and a gas flow path in the casing through which the apertures communicate with one another, the catalyst bodies being disposed downstream of the at least one gas inlet aperture in the gas flow path in the casing; the catalyst bodies being flat bodies formed of multi-layered sheet metal in a multi-channel configuration forming a plurality of gas flow channels connected parallel to one another, the multi-channel configuration having ends, some of the gas flow channels having channel cross sections being defined by at least an adjacent two of the flat bodies being spaced-apart, and the gas flow channels at the ends of the multi-channel configuration having channel cross sections being defined by at least one of the flat bodies; and the flat bodies each having a metal support sheet, a porous adhesion-promoting surface structure of the support sheet with a thickness of less than 10 $\mu$m, a porous intermediate layer applied to the adhesion-promoting surface structure for increasing surface area, the intermediate layer having a layer thickness in the micrometer range and being preferably formed of $Al_2O_3$, and a catalyst coating being applied to the intermediate layer and being formed of a noble metal of group VIII of the periodic table selected from the group consisting of platinum and palladium, the catalyst coating being distributed finely enough to preserve porosity of the intermediate layer.

In accordance with another feature of the invention, the catalyst coating is formed of platinum having a weight per unit of surface area between 0.05 mg/cm$^2$ and 1.0 mg/cm$^2$.

In accordance with a further feature of the invention, the adhesion-promoting surface structure has a thickness in a range between 1 and 5 $\mu$m.

In accordance with an added feature of the invention, the intermediate layer has a thickness in a range between 5 and 20 $\mu$m.

In accordance with an additional feature of the invention, the adhesion-promoting surface structure is formed of $Al_2O_3$.

In accordance with yet another feature of the invention, the gas flow path in the casing is traversed vertically by gas from bottom to top, and the flat bodies have sheet-metal planes oriented vertically in the gas flow path in the casing.

In accordance with yet a further feature of the invention, the casing has a parallelepipedal shape with a bottom or lower region and a front wall having an upper region, the gas inlet aperture is oriented vertically downward in the bottom or lower region, and the gas outlet aperture is disposed in the upper region of the front wall of the casing.

In accordance with yet an added feature of the invention, the casing has approximately the shape or dimensions of a space heater with jacket walls having a depth, and front and back walls having a width and a height being a multiple of the depth of the jacket walls.

In accordance with yet an additional feature of the invention, the casing has a receptacle in the bottom or lower region, and there is provided a removable and re-mountable drawer to be inserted in the receptacle, the drawer having the catalytic flat bodies and the gas inlet aperture, and the drawer and the casing together form a channel system for directing the gas and vapor mixture to be treated in a flow around and through the catalytic flat bodies.

In accordance with again another feature of the invention, the flow path in the casing includes an external oncoming flow and an internal gas flow in the casing, and there are provided baffle configurations in the flow path for aligning the gas flow parallel to the flat bodies and deflecting the gas flow in the direction of the gas outlet aperture, if the directions of the gas inlet aperture and the external oncoming flow as well as of the gas outlet aperture and the internal gas flow in the casing do not match.

In accordance with again a further feature of the invention, the casing includes a rear wall having an inside with an upper region and a top wall having an inside with a front region, and the baffle configurations include a curved baffle having a concave side extending from the upper region of the inside of the rear wall to the front region of the inside of the top wall, for diverting a rising gas and vapor mixture with the gas flow path in the casing extending vertically, to a horizontal direction pointing toward the outlet aperture.

In accordance with again an added feature of the invention, the gas inlet aperture has a leading end, and the baffle configurations include a baffle configuration in the form of an egg crate decking being disposed on the leading end of the downwardly oriented gas inlet aperture for aligning gases and vapors flowing in obliquely from below in a direction parallel to the catalytic flat bodies.

In accordance with again an additional feature of the invention, the gas outlet aperture is formed of a plurality of mutually parallel longitudinal slits.

In accordance with still another feature of the invention, the catalytic flat bodies are each formed of individual single plates being aligned next to one another in one row and are preferably thin-walled.

In accordance with still a further feature of the invention, the catalytic flat bodies are each formed of a corrugated strip having corrugations with crests and troughs each facing a respective one of the front and back walls of the casing.

In accordance with still an added feature of the invention, the single plates or the strip have two sides both being coated with catalyst material forming front and rear reaction surfaces, and the gas and vapor mixture entering through the gas inlet aperture is conducted over both the front and rear reaction surfaces.

In accordance with still an additional feature of the invention, the strip of the catalytic flat body extends in zig-zag fashion.

In accordance with another feature of the invention, the strip is flat and has folding zones in the form of creases, and the final corrugated or zig-zag shape is produced by folding along the folding zones.

In accordance with a further feature of the invention, the drawer has ends and a plurality of the catalytic flat bodies are disposed on at least one of the ends and serve as test bodies, the test bodies being removable from a complete configuration of the catalytic flat bodies in the drawer without interfering with remaining flat bodies.

In accordance with an added feature of the invention, the test bodies are thin-walled metal sheets with predetermined breaking points for braking out the test bodies.

In accordance with an additional feature of the invention, the support sheets of the catalyst bodies are formed of special steel, and at least one of the test bodies and the flat bodies have a sheet thickness in a range between 0.04 mm and 0.07 mm and preferably 0.05 mm.

In accordance with yet another feature of the invention, the single plates or test bodies for the catalytic flat bodies are formed of rectangular single sheets, and the drawer has receiving slits in the vicinity of the receptacle into which the single sheets or test bodies are to be inserted like file cards.

In accordance with yet a further feature of the invention, the drawer has a frame part, and the single plates and the test bodies are to be fixed in the guide slits by elastic deformation and a mechanical strain imposed from outside upon at least the frame part of the drawer.

In accordance with yet an added feature of the invention, there is provided a fine-mesh wire grating covering the gas inlet and outlet apertures and protecting against entry of foreign bodies, substantially without hindering gas flow.

In accordance with yet an additional feature of the invention, there is provided a detent or screw fastener for securing the drawer in an inserted position.

In accordance with again another feature of the invention, there are provided other identical casings, a plurality of the casings matching each other in at least two dimensions, such as depth and height or depth and width, being mounted side by side or one above the other for assembly in modular fashion in one recombiner row.

In accordance with again a further feature of the invention, the zig-zag folded metal strip of the flat bodies has a fold spacing of approximately 20 mm, or the single plates have a mutual spacing in a row of single plates of approximately 20 mm, the flat bodies have a height in a range from approximately 100 to 200 mm, and the gas flow path has a shaft height or length inside the casing in a range between 500 and 1000 mm.

In accordance with again an added feature of the invention, the shaft height is approximately 800 mm.

With the objects of the invention in view, there is also provided a nuclear power plant, comprising a containment; and a device for eliminating hydrogen being located in or forming in the containment by the recombination of hydrogen and oxygen. Therefore, the subject of the invention is also an advantageous use of the device described above for industrial-scale elimination of the hydrogen that is located in or forms in the containment of a nuclear power plant.

In accordance with a concomitant feature of the invention, the containment building has a shell with a wall region and a bottom region inside the containment, a given number of fastening sites distributed in net-like fashion over at least one of the wall and bottom regions, and there are provided other devices for eliminating hydrogen, each of the devices being mounted at a respective one of the fastening sites.

In a standard pressurized water nuclear power plant with a capacity of 1300 MWel and a containment volume of approximately 70,000 m$^3$, it is sufficient to have approximately 50 recombiners according to the invention, with a structural size of 1 m in width by 1 m in height by 140 mm in depth, for instance.

The advantages attainable with the invention are above all that the geometry of the casing of the novel device can be optimized relatively simply because of its simple construction, so that it has small dimensions with the highest possible recombination efficiency and low production costs. The device according to the invention can also be called a flat recombiner, which can be produced as a relatively small modular unit on the order of a convector. Accordingly, using a drawer that is secured by detent means such as a screw fastener in its inserted position, provides a device that is produced for modular assembly, in such a way that a plurality of identical casings, matching one another in at least two dimensions, such as depth and height or depth and width, can be mounted side by side or one above the other to make a recombiner flight or row.

Further essential advantages of the subject of the invention that can be mentioned are follows: An energy-independent catalytic flat recombiner for $H_2/O_2$ recombination is created that is excellently suited for mounting inside the containment or containment shell of a nuclear reactor, and with which harmless elimination of $H_2$ can be attained, in a possibly emergency-situation atmosphere. If a sufficient number of devices according to the invention are mounted in the bottom, wall and top region of a volume to be protected, for instance in the containment of a nuclear power plant, separate thorough-mixing devices that previously had to assure homogenization of the containment atmosphere in the event of an accident or emergency can be dispensed with. The system that was used previously, including catalytic $H_2$ igniters in accordance with the aforementioned Published European Application No. 0 303 144 A1 (1), corresponding to U.S. Pat. No. 4,911,879 (1) and the $H_2$ spark igniter as described in German Published, Non-Prosecuted Application DE 38 16 711 A1, corresponding to U.S. Pat. No. 5,108,696 and to Published International Application PCT/EP 89/00530 (3), can advantageously be expanded. Although the production of ignitable mixtures in general cannot be avoided by the device according to the invention with its flat recombiners, nevertheless the effects of ignitions can be reduced, because even in a vapor-inert atmosphere, the device reduces the $H_2$ and $O_2$ content. In an extreme case, combustion processes after the condensation of the vapor can be prevented entirely.

In the context of a dual concept, a combined system in the containment of nuclear power plants, including (a) the flat recombiners according to the invention and (b) the hydrogen igniters, type WZK 88 and WZB 88 as described in the Siemens brochure entitled "Wasserstoffzünder" [Hydrogen Igniters], Order No. A19100-U822-A107 of May 1988 (3a), is especially advantageous. The flat recombiners (a) function permanently and even in a vapor atmosphere; the hydrogen igniters (b) serve above all to eliminate relatively large, rapidly occurring quantities of $H_2$. As a result, in nuclear power plants, it is possible to replace a previously used $H_2$ mixing system and associated heated flat recombiners (see German Patent DE 31 43 989 C1, corresponding to U.S. Pat. No. 4,631,164).

In inertized containments ($N_2$ is used as the inert gas, for example), ignitable mixtures can be produced after a malfunction from the entry of oxygen resulting from radiolysis. However, if flat recombiners according to the invention are installed, the otherwise necessary resupply of $N_2$, which leads to an additional pressure buildup, can be dispensed with.

The device of the invention also has advantageous effects when the inert conditions in containment pressure relief systems that work with wet scrubbers are maintained, where once again ignitable mixtures can be produced as a result of radiolytic gas formation.

Reference can also be made to the prior art in the form of the recombination system of German Published, Non-Prosecuted Application DE 22 39 952 A1 (4), corresponding to British Patent No. 1 361 326 and to U.S. patent application Ser. No. 179,077 filed Sep. 9, 1971 and 686,437 filed May 14, 1976, in which the two gases $H_2$ and $O_2$ that react with one another are heated to a reaction temperature of at least 620° C., and preferably 760° C. By comparison, in the subject of the invention heating system is not needed or is intentionally dispensed with. The invention is based on the recognition, discovered by experimentation, that if palladium or platinum is used as the catalyst material, heating of the gas and vapor mixture to be treated is not necessary, and that even at low concentrations, such as 1% $H_2$, recombination processes already occur at the catalytic flat bodies, and a temperature increase at the flat bodies also occurs jointly with these processes. This temperature increase, or the recombination working temperature, depends on the $H_2$ concentration, and below the stoichiometric limit on the $O_2$ concentration as well. At relatively high concentrations, such as 8% $H_2$, the ignition temperature can be reached at the catalytic flat bodies. However, since a continuous transition from the recombination processes to the ignition processes occurs, such ignition processes do not occur abruptly, but instead, combustion with a calm flame occurs.

The prior art in Published European Application No. 0 233 564 A2 (5), corresponding to U.S. Pat. No. 4,755,359, should also be mentioned. In the device for eliminating hydrogen from a gas mixture that contains hydrogen which is discussed in that document, foils of a material that accomplishes the hydrogen elimination are secured inside a sealable vessel. Normally, the vessel is sealed off from the atmosphere surrounding it. In order to put the foils disposed inside the vessel into use as needed, a support body with foils lining it is disposed in the vessel in such a way that the foils extend into the surroundings after the vessel is opened. The removal of the hydrogen is effected substantially by adsorption. Smaller quantities of hydrogen are also oxidized in the presence of oxygen in the gas mixture, and the material of the foils catalytically affects the oxidation. Special alloys are used for the region that receives the hydrogen. The fundamental concept in such a case is to avoid open combustion of the hydrogen, and palladium in the form of a lining on vanadium, is also used as a catalyst, so that hydrogen can also be partially converted directly into water at temperatures of around 100° C. By comparison, the concept of the present invention is to work only with catalytic recombination and therefore not to preclude (calmly progressing) combustion processes.

It should also be mentioned with respect to reference (5) that the sandwich foil structure described therein is intended in particular to store $H_2$ in the metal grating, and that manufacturing such sandwich layers is very labor-intensive, and a homogeneous surface structure can only be attained with difficulty. By comparison, the catalytic flat bodies of the invention are simpler in structure, because in a preferred embodiment they need merely to be formed of treated special steel plates with a Pd and/or Pt coating.

The essential advantages of the subject of the invention can be summarized once again as follows:

functional capacity even after relatively long impingement with water vapor;

functional capacity is preserved even in the presence of chemical contaminants, such as iodine, CO, $H_2BO_3$ and methyl iodide, in the gas and vapor mixture to be treated;

functional capacity of the catalytic flat bodies or of the entire device even after immersion in water;

compact structural shape;

very good cost-benefit factor; that is, high $H_2$ conversion rate at minimal catalyst surface area; and ability to function even in a vapor atmosphere.

Other features which are considered as characteristic for the invention are set forth in the appended claims.

Although the invention is illustrated and described herein as embodied in a device for the recombination of hydrogen and oxygen and a nuclear power plant using the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 5 is a top-plan view of a single flight or row of catalytic flat bodies, which fits into a drawer as shown in FIG. 3 and has a first fold spacing;

FIG. 6 is a view similar to FIG. 5 of a single flight or row of catalytic flat bodies, with a reduced fold spacing as compared with FIG. 5;

FIG. 7 is a partly broken-away view of the drawer of FIGS. 5 and 6 being provided with catalytic flat bodies having a spacing that is even further reduced in comparison with FIG. 6 and is constructed as individual metal sheets that can be inserted like file cards and firmly fastened;

Figures 8, 9:
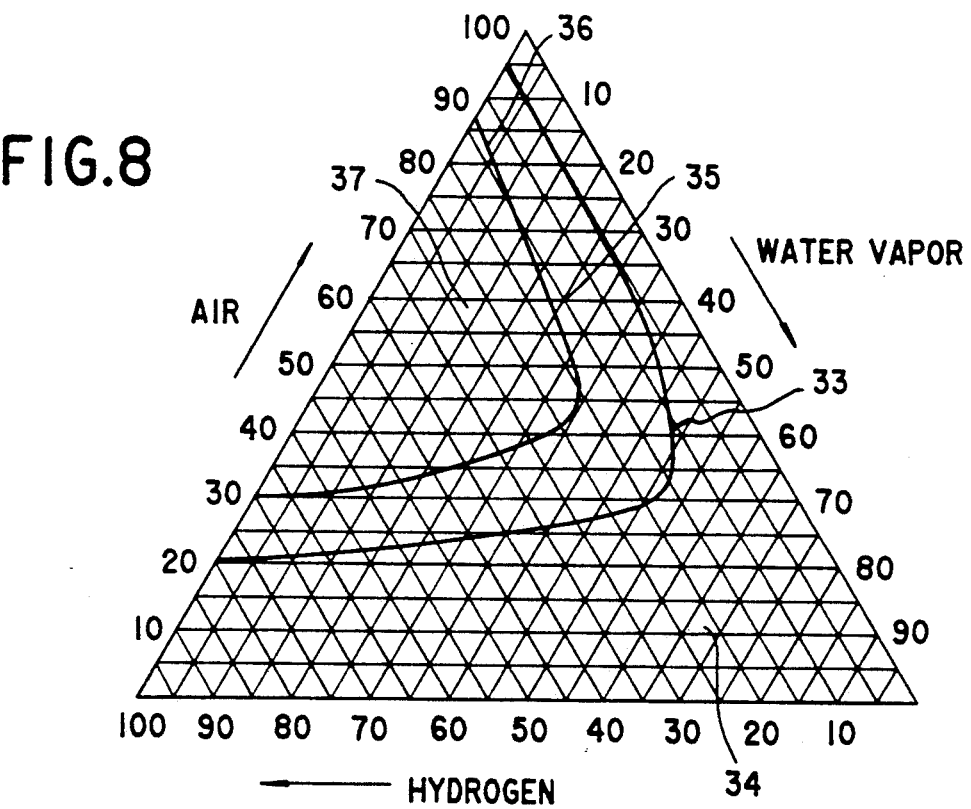
Figure 12:
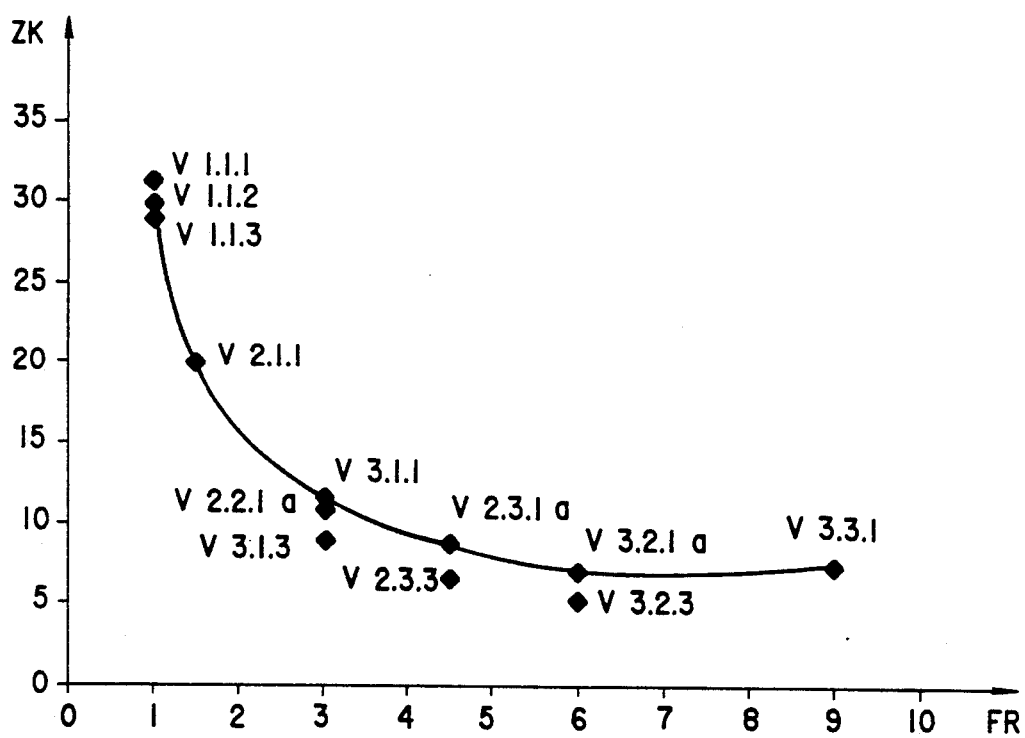
Figure 10:
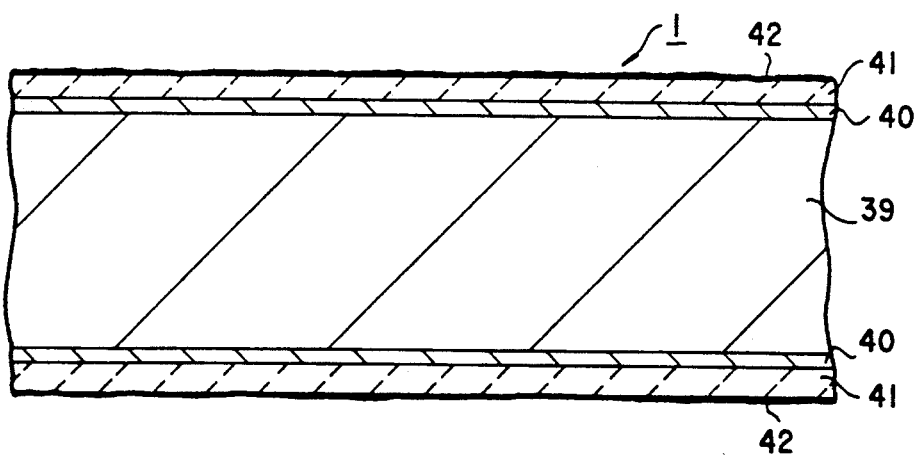

FIG. 8 is a so-called three-substance diagram illustrating ignition limits for a mixture of hydrogen, air and vapor, in which hydrogen concentration is plotted in volume %, progressing from right to left on a lower axis (which is the base of a triangle), air concentration is plotted in volume percent on an air concentration axis that follows the bottom axis in the clockwise direction, and water vapor concentration is plotted in volume percent on the third side of the triangle, with a total percentage range from 0 to 100% being plotted on all three axes;

FIG. 9 is a table which illustrates an $H_2$ recombination rate for a catalytic flat body with an effective surface area of 46 cm$^2$, having five columns in which, from left to right, the following physical variables are plotted: 1) time in minutes; 2) hydrogen concentration $CH_2$ in volume percent; 3) hydrogen flow velocity $VH_2$ in liters per minute; 4) hydrogen concentration $CH_2$ in volume percent (intermediate values with respect to column 2); and 5) flow velocity $V_{gas}$ of the inflowing gas to be treated, in liters per minute;

FIG. 10 is an enlarged, fragmentary, sectional view of a flat body, in which outer layers are shown thicker than in actuality, for the sake greater clarity;

FIG. 11 is a table in which essential experimental results for various test apparatuses of a recombiner test numbered V1.1.1, V1.1.2 and so forth, are shown (in column 1); and more specifically, in which a corrected time constant, a maximum temperature T-max in the gas flow path ("shaft") of the recombiner and a maximum temperature T-max of the flat bodies (in columns 5–7) as a function of characteristic parameters of the recombiner (see columns 2–4 and 8) are plotted, with these characteristic parameters being the fold spacing of zigzag strip-like flat bodies, the height of the flat bodies ("catalyst height"), and a relative or standardized area; and FIG. 12 is a diagram in which a course of a time constant ZK of column 5 of FIG. 11 is plotted as a function of a relative catalyst area FR (in column 8 of FIG. 11), with the various test apparatuses being designated as V1.1.1, V1.1.2, and so forth, in accordance with the table of FIG. 11.

Referring now to the figures of the drawing in detail and first, particularly, to FIG. 1 thereof, there is seen a device for recombining hydrogen and oxygen, which is referred to generally below as a recombiner R, that works with catalytic flat bodies 1, through which a gas and vapor mixture containing hydrogen to be eliminated can be conducted, as is indicated by flow arrows f1 (inflow or external oncoming flow) and f2 (outflow), which together form an internal gas flow f1, f2. The flat bodies 1 may be a metallized plastic band (or a plastic slab or strip), on which a coating of catalyst material, in particular platinum or palladium, is then applied, as a substrate layer. Preferably, because it makes for a sturdier configuration, the catalytic flat bodies generally are formed of sheet metal, and in particular a pretreated corrosion-resistant sheet steel that is then coated with the catalytically effective outer layer (in particular, Pt or Pd). The flat bodies 1 are retained in a casing that is generally identified by reference numeral and are surrounded by this casing in such a way that a chimney-like gas flow, as is indicated by the flow arrows f1, f2 and flow arrows f12, can develop. To this end, the casing 2 has at least one permanently open gas inlet aperture 3 in the vicinity of a bottom wall 2a thereof, preferably pointing downward, as well as one permanently open gas outlet aperture 4 in an upper region of the casing 2, which is oriented substantially toward the front of the casing 2. As can be seen, the catalytic flat bodies 1 are then disposed inside the casing 2 and specifically, downstream of the gas inlet aperture 3 in the gas flow path 11.

The casing 2 is constructed in such a way as to be substantially parallelepipedal. In the example shown (in terms of its internal dimensions), it has a depth t of 120 mm, a width b of 900 mm and a height H of 800 mm. It can therefore be said that the casing 2 has approximately the same dimensions as a space heater, and the width b and height h of front and back walls 2b, 2c thereof amount to a multiple of the depth t of jacket walls 2a, 2d, 2e and 2f. The jacket walls are formed by the bottom wall 2a, two side walls 2d, and a top wall 2e, that is constructed as a curved guide wall or baffle, with correspondingly shaped end wall parts 2f, which are located in the same plane as the side walls 2d and are formed in one piece with each of them. The guide wall 2e acts as a flow baffle which—if the directions of the gas outlet aperture 4 and the internal gas flow in the casing do not match, as is seen by the gas flows oriented upward and symbolized by the dashed flow arrows f12—deflects the latter gas flow indicated the flow arrows f2 in the direction of the gas outlet aperture 4. The internal gas flow in the casing is thereby deflected through an angle of approximately 90° from the vertical to the horizontal. The gas outlet aperture is formed by the open side of a hood 5 having the two end walls 2f and the curved guide wall 2e, which is concave on the inside. The casing 2 is preferably a sheet-metal casing, which is produced by welding its individual casing walls 2a-2f together.

The catalytic flat bodies 1 are formed by a corrugated, undulating or wavy sheet-metal strip 6. Crests and troughs of the waves of the strip 6 are preferably oriented both toward the front (front wall 2b) and toward the back (back wall 2c). In particular, the sheet-metal strip 6 has a zig-zag course. In order to produce the sheet-metal strip 6, a flat strip is suitably provided with folding zones in the form of creases, and the final corrugated or zig-zag shape is produced by folding along folding zones 7. A fold spacing from peak to peak is indicated by reference symbol k1 and a catalyst height is indicated by reference symbol k2. As mentioned initially above, a reactive coating 12 of this sheet-metal strip 6 is formed of a thin layer, in particular of platinum and/or palladium, on the micrometer range. Otherwise, the multilayered structure of the flat bodies will be described in further detail below. The sheet-metal strip 6 is coated on both sides with catalyst material, forming reaction surfaces, so that the gas and vapor mixture entering through the gas inlet aperture 3 can flow over both the front and back reaction surfaces of the sheet-metal strip. The gas inlet aperture 3 is defined by four aperture edges 3a-3d, which lend the gas inlet aperture 3 the form of an elongated rectangle or slit. This slit causes the gas and vapor mixture to flow to both the front and back sides of the sheet-metal strip 6. A flow rectification in the case of an oblique oncoming flow from below is assured by a baffle configuration 8 having a low height al, on which the sheet-metal strip 6 stands. The baffle configuration 8 is constructed in particular as an egg crate decking that can be secured (in particular screwed) in the bottom region of the casing 2. As an alternative to the egg crate decking, a perforated plate 9 with sieve-like perforations may also be provided, although the effect of flow rectification is not as good as with the egg crate decking. For the sake of greater clarity, the perforated plate 9 is only shown in a portion of the casing 2. Accordingly, both the front and back sides of the sheet-metal strip 6 experience a flow around them and thus they both contribute approximately equally to the catalytic recombination of the hydrogen, contained in the entering mixture flow, with the oxygen that is likewise contained in it.

Accordingly, the sheet metal strip 6 forms a plurality of catalytic flat bodies with a rectangular outline, which are provided with a catalytic coating 12 on both their front and rear sides. It will be appreciated that the gas flow path 11 formed by the sheet-metal strip 6, that is by the various flat bodies 1 on its front and back sides, is a multi-channel configuration that includes a plurality of gas flow channels 11.1 on the front and 11.2 on the back. The channels 11.1 and 11.2 are connected parallel to one another and have a triangular channel cross section. In the illustrated embodiment, the channels 11., 11.2 are defined by at least two spaced-apart adjacent flat bodies 1 and the inside of an associated casing wall, either 2b or 2c. On the ends of the sheet-metal strip 6 or of the multi-channel configuration (the left and right ends in FIG. 1), the channel cross section is defined by at least one flat body 1, and naturally by the adjacent casing walls 2b, 2d, 2c. It may be suitable to provide the inside of the casing walls 2b, 2d and 2c with a catalytic coating at the level of the sheet-metal strip a well, so as to increase the effective catalyst area of the recombiner R in this way. The desired chimney effect is greatest if the internal gas flow path 11 in the casing is oriented vertically from bottom to top, as shown, and the flat bodies 1 are also disposed with their sheet-metal planes vertically oriented in this internal gas flow path 11 in the casing.

Figure 1:
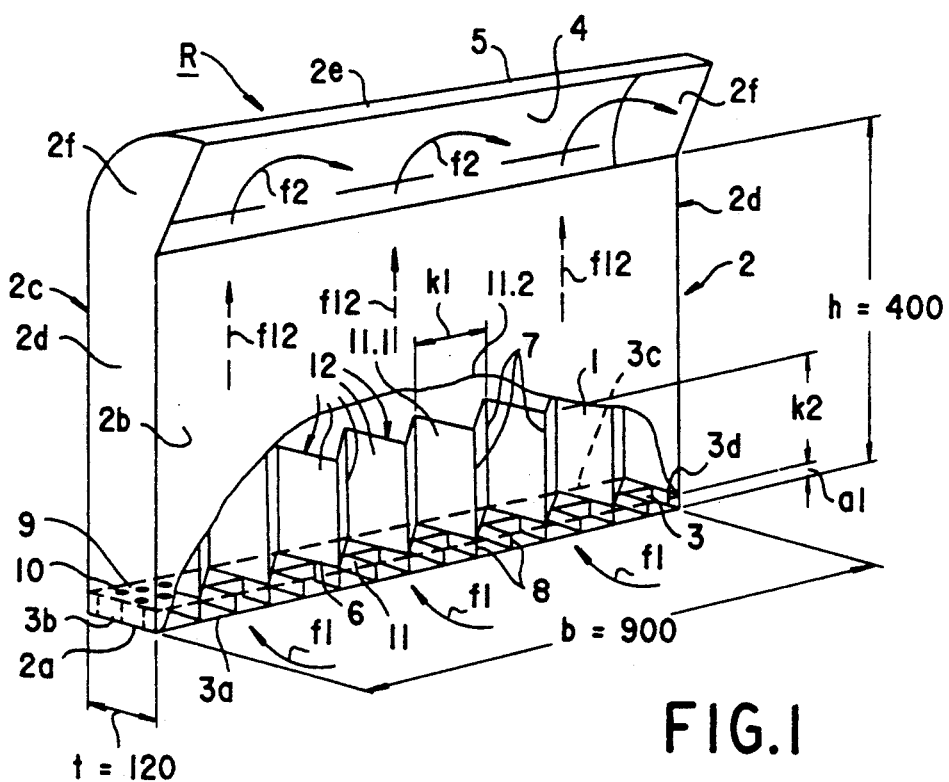
FIG. 1 is a partly broken-away, diagrammatic, perspective view of a first, simplified embodiment of a device according to the invention, which is referred to below as a recombiner.
Figure 2:
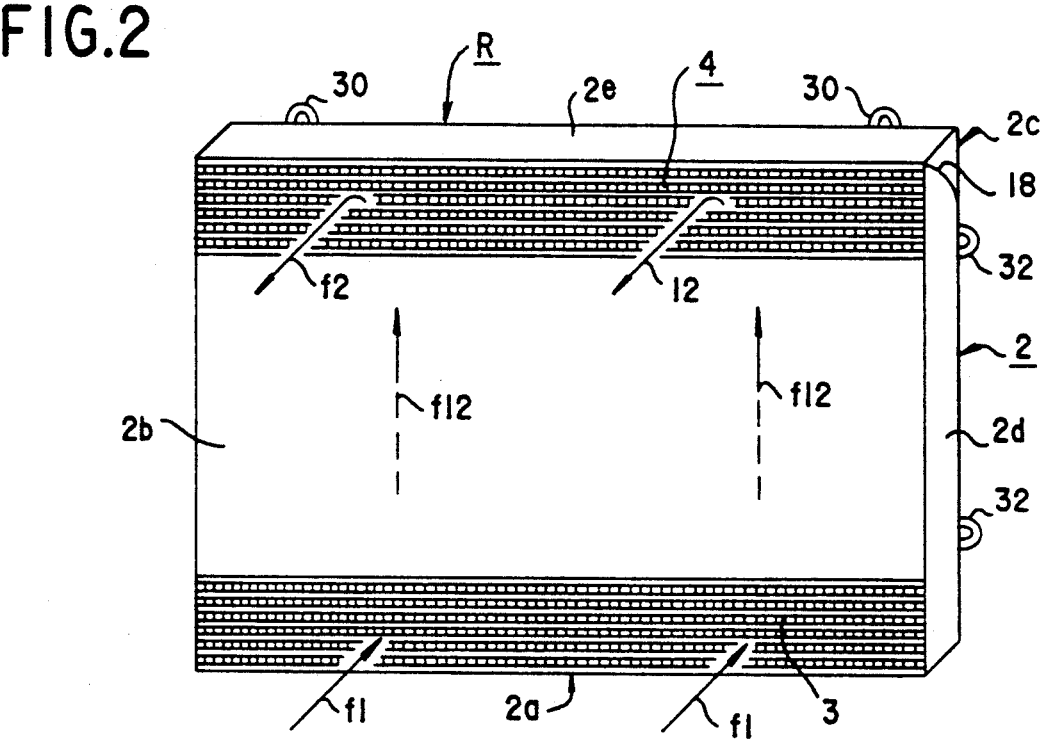
FIG. 2 is a perspective view from outside a second, more-sophisticated version of the recombiner.
Figure 3:
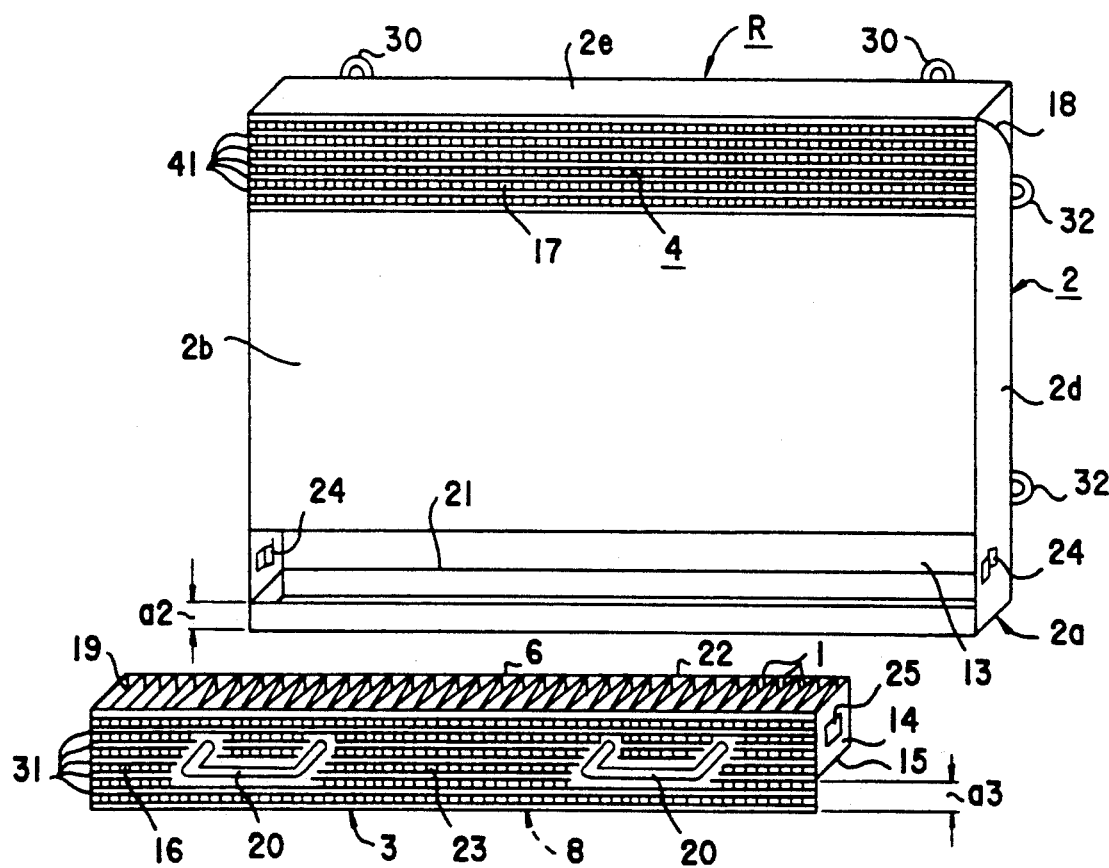
FIG. 3 is a perspective view of the recombiner of FIG. 2, with a lower casing drawer containing catalytic flat bodies, being pulled out.

In the second exemplary embodiment shown in FIGS. 2 and 3, the casing 2 of the recombiner R has a receptacle 13 in its lower region for a removable and re-mountable drawer 14, as is seen in FIG. 3. This drawer 14 has the catalytic flat bodies 1, the gas inlet aperture generally identified by reference numeral 3, and together with the casing 2, the drawer 14 has a channel system 15 to provide a flow of the gas and vapor mixture to be treated around and through the catalytic flat bodies 1. The gas inlet aperture 3 is oriented downward again (the casing 2 is open at the bottom). The gas outlet aperture 4 is formed by a plurality of longitudinal outlet slits 41 extending parallel to one another and the gas inlet aperture 3 is formed by a plurality of longitudinal inlet slits 31 extending parallel to one another. The gas inlet and outlet apertures 3 and 4, or the longitudinal slits 31, 41, are each covered by a respective fine-mesh wire grating 16 and 17, which virtually does not hinder the gas flow and protects against the entry of foreign bodies. Only the front portion of the grating 16, which covers the front slits 31, can be seen, but not the downward-pointing part of the grating 16. In a departure from the example of FIG. 1, an internal curved baffle 18 in the casing in this case serves to deflect the vertically upwardly flowing mixture streams. The baffle 18 is shown in FIGS. 2 and 3 as if the right side wall 2d were transparent. The baffle 18 extends with its concave side from the upper region of the inside of the back wall of the casing 2 upward and toward the front to the front region of the inside of the cover wall 2e, so that the gas and vapor mixture that is rising, in the case of a vertically extending internal gas flow path 11, is deflected to the horizontal direction pointing toward the outlet aperture 4, as is indicated by the flow arrows f2.

FIG. 3 shows that a plurality of catalytic flat bodies 19 is disposed at one end of the drawer 14. The catalytic flat bodies 19 act as test bodies and to this end can be removed from the overall configuration of catalytic flat bodies 1 of the drawer 14 without interfering with the other flat bodies 1. To that end, these test bodies 19 are constructed as small sheet-metal plates, which are inserted like file cards into guide slits on the insides of the drawer 14, which are not shown in FIG. 3. The structure of the other flat bodies 1 is basically as shown and described in conjunction with FIG. 1. For instance, four test bodies 19 may be inserted on one end of the drawer 14, where they are spaced apart in such a way that virtually the same velocity and extent of impingement as for the other flat bodies 1 is produced, so that after a certain time in operation, such as a year, one such test body 19 can be removed and investigated to find what condition its catalytic outer layer is in. In order to make the drawer 14 easier to manipulate, it may be provided with handles 20, and preferably with one handle on each of the two ends of its front.

The channel system 15 in the exemplary embodiment of FIGS. 2 and 3 is constructed as follows: An encompassing frame 21 is secured on the inside of the bottom wall 2a of the casing, in its peripheral region. When in the inserted state, the drawer 14 rests on this frame with a frame part 22. The frame part 22 has no bottom and its height is shorter than a front wall 23 of the drawer 14 by a short length a3. This shortening a3 is completely o at least largely equivalent to a dimension a2 of the height of the frame 21. The frame part 22, which is screwed or welded to the front wall 23 of the drawer 14, serves to retain the flat bodies 1 and the test bodies 19. Like the casing 2, the bottom of this frame part 22 is open. In the inserted state shown in FIG. 2, the gases/vapors to be treated can also flow through the aperture 3 between the flat bodies 1 and the test bodies 19, in such a way that the bodies 1, 19 can have a flow of the gases and vapors around them from both sides. The drawer 14 can be secured in its inserted position shown in FIG. 2 by detent means 24, 25 or a screw fastener. This may, for instance, include a curved leaf spring 24 secured to the inside of the receptacle 13 on its side edges, and a detent recess 25 fitting it, on the side edges of the frame part 22. The detent indentation 25 can only be seen in the right-hand part of the drawer 14, but not in the left.

Figure 4:
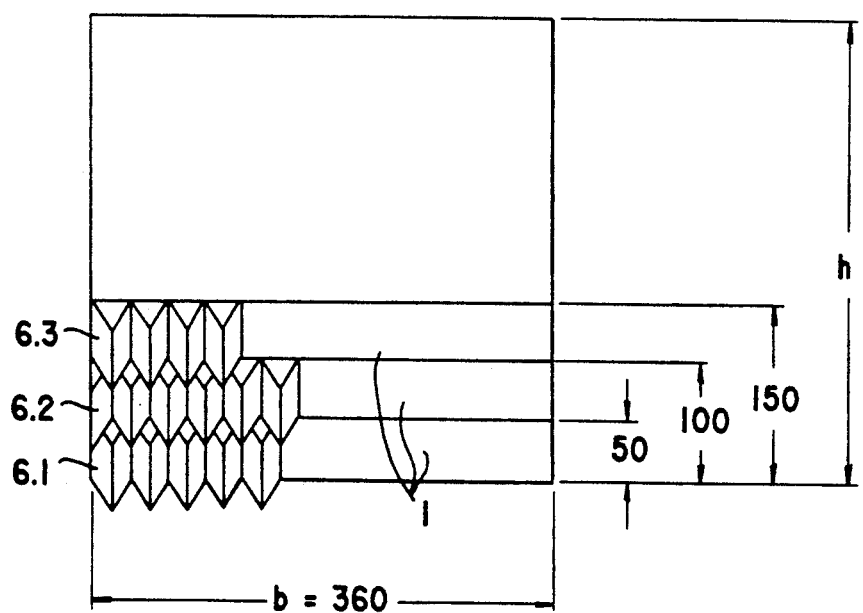
FIG. 4 is a simplified, front-elevational view of a recombiner with three stacked layers of catalytic flat bodies.

FIG. 4 shows in a diagrammatic and simplified form that in the exemplary of FIG. 1, the flat bodies 1 may also be stacked in a plurality of layers disposed one above the other. Each of several associated sheet-metal strips 6.1, 6.2, 6.3 has a height of 50 mm, for example, so that in the case of the three stacked sheet-metal strips, for instance, a total height of 150 mm results. Folding of adjacent sheet-metal strips, that is the strips 6.1–6.2 or 6.2–6.3, is suitably offset from one another, as is indicated in perspective and diagrammatically, so that the one layer of the sheet-metal strip is stably seated on whichever layer is located under it. The number of stacked flat bodies 1 or associated sheet-metal strips depends on the "chimney height", that is on the structural height h of the recombiner and/or on the flow velocity. The latter may also be increased, without increasing the chimney action, by using blowers.

The "intrinsically safe" version shown, which makes do without a blower, is preferred because it is passively safe, or in other words it makes do without switching on any blower current.

It is understood from the view of FIG. 4 that two or three drawers which are stacked one above the other may also be insertable into suitable recesses 13 in the exemplary embodiment of FIGS. 2 and 3, instead of a single drawer 14.

In order to increase the effective catalyst area of the flat bodies 1 of each individual layer or of each drawer 14, it is recommended, if the flat bodies 1 are constructed in corrugated or zig-zag fashion, to reduce the folding spacings, as is illustrated in FIGS. 5 and 6. In FIG. 5, the spacing k1 between two adjacent peaks 26 of the sheet-metal strip 6 is 60 mm, or 120 m between every other successive peak of the sheet-metal strip 6. FIG. 5 shows that by means of pairs 27 of sheet-metal guide strips that are secured in spot fashion or in some other suitable way, guide slits 28 are formed on the insides of the front wall 23 and of the back wall of the frame part 22, with which the "roof ridges" or peaks 26 of the folded sheet-metal strip 6 can be fixed inside the casing 2 or the drawer 14.

FIG. 6 shows that by reducing the spacing between the guide slits 28 and the associated sheet-metal strips, a folding density k11 of the sheet-metal strip 6 can be increased. The folding density k11 in this case is only 40 mm.

In the exemplary embodiment of FIG. 7, the holder used for the test bodies 19 is also used for the other flat bodies 1. Both the test bodies 19 and the flat bodies 1 are formed of individual plates 100, in particular with thin walls, that can be lined up in a flight or row. Preferably, individual sheet-metal plates can be inserted in file-card-like fashion into the guide slits 28 formed by the pairs 27 of guide strips. This version has the advantage of providing a completely identical structure for the test bodies and the flat bodies. Through the use of a non-illustrated screw fastening, the individual plates 100 can be fastened inside the frame part 22 or the drawer 14 seen in FIG. 3, in a vibration-proof manner with elastic deformation. The fastening forces can act upon the frame in the direction of arrows 38, for example.

In the case of the exemplary embodiments described above and shown in FIGS. 1–7, the test bodies 19 can additionally be secured against undesirable removal by constructing them as thin-walled metal sheets that can be broken out by means of rated breaking points. For the same purpose, the test bodies 19 may be constructed as foils that can be torn along predetermined breaking lines. For example, as is seen in FIG. 7, one small spot weld or a hard solder or brazing point 29 could be provided on each of the two sides of a test body 19. These fixations are so weak that they are destroyed if a test body 19 is grabbed and pulled upward with tongs and tensile strain. It is also possible, for especially vibration-proof and flow-proof securing of the other flat bodies 1, to secure them additionally by means of the aforementioned spot welds or hard solder or brazing points. A spacing k12 between adjacent individual plates 100 is reduced even further, for instance to 20 mm, in comparison with the spacing k1 or the density k11.

FIGS. 2 and 3 show that the casing 2 is provided on its back wall with means 30 for securing it in suspended fashion to a vertical building wall. Such means may be fastening eyelets, for example. Corresponding fastening eyelets 32 may also be provided on the side walls.

In the preferred embodiment of FIGS. 2 and 3, the recombiner R is very well suited for modular assembly, in such a way that a plurality of identical casings 2, matching in at least two dimensions, such as depth t and height h or depth t and width b, can be mounted side by side or one above the other to make one recombiner flight or row.

The downward-pointing orientation of the gas inlet aperture 3 and the frontward orientation of the gas outlet aperture 4 provide the advantage, among others, of minimizing the burden from dust, since there are no upward-facing apertures through which dust in the building could normally preferentially enter. In addition, gas inlet apertures that are oriented toward the front could also be provided, in the form of the longitudinal slits 31, in order to increase the inflow cross section, as is seen in FIG. 3.

The recombiner according to the invention is a component that is preferably suitable for industrial elimination of the hydrogen that forms or is located in the containment of a nuclear power plant. In combination with the modular construction described above, an advantageous system of recombiners inside a nuclear power plant is obtained by mounting a plurality of such recombiners at a corresponding number of fastening sites which are distributed in netlike fashion over the wall and/or bottom region of the containment building or shell.

The three-substance diagram of FIG. 8 shows an ignition limit 33. Recombination events are already possible in a field 34 outside this ignition limit 33, but naturally no ignition events are possible. In a field 35 inside the ignition limit 33, ignition of the hydrogen can occur. However, it does not happen suddenly but rather in a continuous transition, because the recombiner according to the invention has already been in operation before the hydrogen concentration exceeds the ignition limit. This therefore precludes the operating range from reaching a field 37 bounded by a so-called detonation limit 36 of the field 35.

The table of FIG. 9 shows that in a test recombiner with an effective catalytic surface area of 46 cm$^2$, the mean recombination rate is in the range from 2.1 volume % $H_2$ to 1.1 volume % $H_2$, at 0.166 liters of $H_2$ per minute.

The calculations in the table of FIG. 9 show that the $H_2$ recombination rate decreases as the $H_2$ concentration decreases, and also that the gas volumetric flow moving to the catalytic flat body as a result of convection and diffusion is virtually constant in the range studied and on average is 10.2 l/min. It can be concluded from this that for a given geometry of a recombiner, the recombination rate depends only on the speed of transport of the gas molecules to the catalytic flat bodies, and that a 100% recombination always occurs on them themselves, regardless of the volumetric $H_2$ concentration.

FIG. 10 shows an enlarged portion of the flat body 1 made up of multi-layered sheet metal, which may be used for the sheet-metal strip 6 (shown in FIGS. 1, 3, 4, 5 and 6) and for the test bodies 19 or individual plates 100 (shown in FIGS. 3 and 7). Accordingly, the catalytic flat body is formed of an inner support sheet or core 39, which is preferably made of special steel. In that case, great strength of the flat bodies 1 can already be attained if they are produced in the form of relatively thin foils, having a thickness in the range between 0.04 mm and 0.07 mm. A favorable value for the total thickness of the flat body including a coating 40 to 42 on both sides in on the order of 0.05 mm. The individual elements 40, 41 and 42 of the coating are described below. It then has a relatively low thermal capacity and heats rapidly as recombination processes begin, which is desirable. The term special steel is understood to be corrosion-resistant steel. The next layer on the support sheet or core 39 of the flat body 1 is a porous adhesion promoting surface structure 40 of the support sheet, with a thickness of less than 10 $\mu$m. A thickness range that is favorable for this surface structure 40 is on the order of between 1 and 3 $\mu$m, and therefore less than 5 $\mu$m. It can be produced by heat-treating the special steel, which contains aluminum as an alloy component, causing some of the aluminum contained in the alloy to diffuse out and react with the oxygen from the ambient air, forming $AlO_3$. This is $\alpha$-aluminum oxide, although in order to prevent it from being hygroscopic (water-attracting), it must only have roughness, but no capillaries. This surface structure 40 should function as a porous, coarse adhesion promoter for the further layer 41. The rough surface structure may also be produced by sandblasting instead of a heat treatment of the support plate 39, for instance. In that case, no $Al_2O_3$ forms. A further option for producing an adhesion-promoting surface structure 40 is to immerse the support sheet 39 in aluminum paint, so that superfine particles of aluminum continue to adhere and are distributed over the surface. Through the use of a heat treatment, the solvent is then evaporated and the aluminum is oxidized.

Next, over the support sheet 39 that has been provided with the adhesion-promoting surface structure 40 on both sides, a porous intermediate layer 41 of $Al_2O_3$ is applied, which increases the surface area and likewise has a layer thickness in the micrometer range. The intermediate layer generally involves stabilized aluminum oxides. Instead of the aluminum oxides, silicon dioxide ($SiO_2$) would in principle be suitable as well. The coating suspension, which is applied by spraying, immersion or painting on the layer 40, contains aluminum oxides and hydroxides. After the application, the suspension is dried and heat-treated. A so-called calcination takes place, with conversion into gamma-aluminum oxides. The aluminum hydroxides act as binders in the suspension. The result is a continuous ceramic intermediate layer 41 that is water-repellent. A preferred weight per unit of surface area for this intermediate layer 42 is 0.5 mg to 5 mg/cm$^2$ (washcoat quantity).

The noble metal that then forms the actual catalyst, specifically platinum or palladium and preferably platinum, is then applied to the intermediate layer 41 and forms the catalyst coating in such finely distributed form that the porosity of the intermediate layer 41 is preserved and a very large catalytic surface is thus produced. Platinum or palladium belongs to group VIII of the periodic system, which also includes nickel. It has been demonstrated that for platinum, which is relatively expensive, a very low weight per unit of surface area within an outermost layer 42 suffices. This weight per unit of surface area is preferably in the range between 0.05 mg/cm and 1.0 mg/cm$^2$. In this way, the catalyst coating 42 is superficially integrated into the intermediate layer 41, with a very low crystal size of the platinum (or palladium). The catalyst coating 42 is represented by a heavy line with irregular "crests" and "troughs", in order to symbolically represent the surface roughness. In the production of the catalyst coating 42, it is practical to proceed in such a way that the platinum is dissolved in chloroplactinic acid, and this solution is sprayed onto the intermediate layer 41, for example. Next, the volatile components of the solvent are expelled by heating, and the oxidized platinum is reduced, in a hydrogen atmosphere, to metallic, finely crystalline platinum.

In practical use in a recombiner, the thus-obtained flat body 1, with its inner support sheet or core 39 and the coating 40 to 42, withstands not only temperatures of its normal operating range between approximately 400° and 450° C. but even average temperatures of up to 850° C., without perceptible impairment of its catalyst action. However, since the recombiner R according to the invention is a component that must always function reliably during a malfunction in the event of $H_2$ production, the inspections of the functional capacity of the flat bodies 1, which is already referred to above, by the removal Of the test bodies 19 and investigating them for their functional capacity in a laboratory, are indicated at regular intervals. "Regular intervals" are understood to mean an investigation every three months, for instance. Thermal load peaks beyond 850° C. can also be briefly withstood by the flat bodies without impairment of their function. This may, for instance, occur upon internal ignition, if the H₂ concentration should briefly exceed the ignition limit.

FIG. 11, column 1, shows 17 different flat bodies 1 or test batches, numbered V 1.1.1, V 1.1.2, V 1.1.3 and so on through V 3.3.1. The depth of the various flat bodies (referred to as catalysts in FIG. 11) was t=120 mm for all of the flat bodies, as shown in FIG. 1 or FIG. 5. The relative (standardized) catalyst surface area of the dimensionless value 1 was assigned to a flat body 1 that within a sheet-metal strip 6 (see FIG. 5) was equipped with a fold spacing of k1=60 mm and a catalyst height of k2=75 mm (see FIG. 1). The test batches V 2.1.1 and V 2.1.1a, by comparison, have an increased relative catalyst surface area of 1.5, because their fold spacing was reduced from 60 mm to 40 mm. The subsequent test batches V 2.2.1 through V 2.2.1b have the relative catalyst surface area of FR=3, because for them the catalyst height was increased from 75 mm to 150 mm. These are followed in the table of FIG. 11 by three test batches V 2.3.1 through V 2.3.3 with a relative catalyst surface area of 4.5, because for them the catalyst height was increased from 150 mm to 225 mm. It follows without further explanation that in the further test batches V 3.1.1 and V 3.1.3, the relative catalyst area has the value 3, for the test batches V 3.2.1 through V 3.2.3 it has the value FR=6, and for the last test batch V 3.3.1, it has the value FR=9. Different shaft heights, that are identical with the internal gas flow path 11, were also assigned to the various test batches. Shaft heights with values of 400 mm, 600 mm and 800 mm were studied. In a test path, the various test batches were exposed to a gas and vapor mixture that contained hydrogen, for instance 4 volume %, and the time constant ZK that indicates the period of time after which the H₂ concentration had dropped to half its original value is measured. It can be seen that the smallest time constant, ZK=5.33 minutes, was measured in the next-to-last test batch V 3.2.3. The incident maximum temperatures T-max in the shaft (within the gas flow path 11) and of the flat bodies are shown as well, in column 6 and 7.

The diagram of FIG. 12 shows the course of the time constant ZK in minutes (on the ordinate) as a function of the relative catalyst area FR (on the abcissa), from which it can be seen that the test batches V 2.3.3, with ZK=6.67 minutes and V 3.2.3, with ZK=5.33 minutes, produce particularly favorable values or in other words the relatively fastest recombination. Accordingly, in a preferred embodiment of the invention, the fold spacing, which is generally identified as k1, for a zig-zag-folded metal strip for the flat bodies 1, or the spacing k12 from one individual plate 100 to another individual plate 100 (as seen in FIG. 7) within one flight or row of plates, is defined as approximately 20 mm, the height k2 of the flat bodies 1 is in the range from approximately 100 to 200 mm, and the shaft height h or the length of the internal gas flow path 11 in the casing is in the range between 500 and 1000 mm. A preferred value for the shaft height is on the order of 800 mm, as can be seen in FIG. 12, but increasing the shaft height to 1000 mm has no substantial influence with respect to the time constant. It can be seen from FIG. 12 that as the catalyst area increases, the time constant ZK decreases approximately parabolically, dropping through a minimum and then rising again. This can be explained by the fact that with an approximately 100% hydrogen burnout in a test module or test batch, a further addition of catalyzer area leads only to an increase in the flow resistance. Increasing the shaft height leads to a limited improvement in the H₂ decomposition rate and simultaneously to a pronounced temperature lowering at the catalyst, as columns 6 and 7 of FIG. 11 clearly show.

It was discovered that for calculating the time constant ZK, the following approximation equation can be given:

$$ZK = \frac{0.1389 \text{ min/m}^3 \cdot V_{RSB}}{n} \cdot \sqrt{\frac{\rho_{RSB}}{1.18 \text{ kg/m}^3}}$$

where $$\rho_{RSB} = \frac{m_{RSB}}{V_{RSB}}.$$

In the equation, the symbols have the following meanings:

$V_{RSB}$=gas volume in a reactor containment vessel, or in other words in containment;

$\rho_{RSB}$=mean density of the gas and vapor mixture contained in the reactor containment;

$m_{RSB}$=mass of the gas and vapor mixture contained in the reactor containment; and n=number of recombiners installed inside the reactor containment.

This calculated time constant ZK can then be compared with the time constant ZK ascertained from a test module (see FIG. 11). The latter time constant is therefore called the corrected time constant.

The experiments carried out have shown that the time for halving the hydrogen concentration in a vessel is a constant (time constant ZK), which depends on the density $\rho_{RSB}$ in the vessel, as the formula shows.

We claims:

1. A device for the recombination of hydrogen and oxygen, comprising:
   catalyst bodies having surfaces and catalytic coating on said surfaces over which a gas and vapor mixture containing hydrogen to be eliminated is to be conducted;
   a casing surrounding and retaining said catalyst bodies, said casing having at least one permanently open gas inlet aperture and one permanently open gas outlet aperture, and a gas flow path in said casing through which said apertures communicate with one another, said catalyst bodies being disposed downstream of said at least one gas inlet aperture in said gas flow path in said casing;
   said catalyst bodies being flat bodies formed of multi-layered sheet metal in a multi-channel configuration forming a plurality of gas flow channels connected parallel to one another, said multi-channel configuration having ends, some of said gas flow channels having channel cross sections being defined by at least an adjacent two of said flat bodies being spaced-apart, and said gas flow channels at the ends of said multi-channel configuration having channel cross sections being defined by at least one of said flat bodies; and
   said flat bodies each having:

a metal support sheet, a porous adhesion-promoting surface structure of said support sheet with a thickness of less than 10 μm, a porous intermediate layer applied to said adhesion-promoting surface structure for increasing surface area, and a catalyst coating being applied to said intermediate layer and being formed of a noble metal selected from the group consisting of platinum and palladium, said catalyst coating being distributed finely enough to preserve porosity of said intermediate layer.

2. The device according to claim 1, wherein said intermediate layer is formed of $Al_2O_3$.

3. The device according to claim 1, wherein said catalyst coating is formed of platinum having a weight per unit of surface area between 0.05 mg/cm$^2$ and 1.0 mg/cm$^2$.

4. The device according to claim 1, wherein said adhesion-promoting surface structure has a thickness in a range between 1 and 5 μm.

5. The device according to claim 1, wherein said intermediate layer has a thickness in a range between 5 and 20 μm.

6. The device according to claim 1, wherein said adhesion-promoting surface structure is formed of $Al_2O_3$.

7. The device according to claim 1, wherein said gas flow path in said casing is traversed vertically by gas from bottom to top, and said flat bodies have sheet-metal planes oriented vertically in said gas flow path in said casing.

8. The device according to claim 1, wherein said casing has a parallelepipedal shape with a bottom or lower region and a front wall having an upper region, said gas inlet aperture is oriented vertically downward in said bottom or lower region, and said gas outlet aperture is disposed in said upper region of said front wall of said casing.

9. The device according to claim 7, wherein said casing has jacket walls having a depth, and front and back walls having a width and a height being a multiple of the depth of said jacket walls.

10. The device according to claim 8, wherein said casing has a receptacle in said bottom or lower region, and including a removable and re-mountable drawer to be inserted in said receptacle, said drawer having said catalytic flat bodies and said gas inlet aperture, and said drawer and said casing together form a channel system for directing the gas and vapor mixture to be treated in a flow around and through said catalytic flat bodies.

11. The device according to claim 8, including baffle configurations in said flow path for aligning said gas flow parallel to said flat bodies and deflecting said gas flow in the direction of said gas outlet aperture.

12. The device according to claim 11, wherein said casing includes a rear wall having an inside with an upper region and a top wall having an inside with a front region, and said baffle configurations include a curved baffle having a concave side extending from the upper region of the inside of said rear wall to the front region of the inside of said top wall, for diverting a rising gas and vapor mixture with said gas flow path in said casing extending vertically, to a horizontal direction pointing toward said outlet aperture.

13. The device according to claim 11, wherein said gas inlet aperture has a leading end, and said baffle configurations include a baffle configuration in the form of an egg crate decking being disposed on the leading end of said downwardly oriented gas inlet aperture for aligning gases and vapors flowing in obliquely from below in a direction parallel to said catalytic flat bodies.

14. The device according to claim 7, wherein said gas outlet aperture is formed of a plurality of mutually parallel longitudinal slits.

15. The device according to claim 7, wherein said catalytic flat bodies are each formed of individual single plates being aligned next to one another in one row.

16. The device according to claim 15, wherein said catalytic flat bodies have a sheet thickness in a range between 0.04 mm and 0.07 mm.

17. The device according to claim 9, wherein said catalytic flat bodies are each formed of a corrugated strip having corrugations with crests and troughs each facing a respective one of said front and back walls of said casing.

18. The device according to claim 15, wherein said single plates have two sides both being coated with catalyst material forming front and rear reaction surfaces, and the gas and vapor mixture entering through said gas inlet aperture is conducted over both said front and rear reaction surfaces.

19. The device according to claim 17, wherein said strip has two sides both being coated with catalyst material forming front and rear reaction surfaces, and the gas and vapor mixture entering through said gas inlet aperture is conducted over both said front and rear reaction surfaces.

20. The device according to claim 17, wherein said strip of said catalytic flat body extends in zig-zag fashion.

21. The device according to claim 17, wherein said strip is flat and has folding zones in the form of creases, and said corrugated shape is produced by folding along said folding zones.

22. The device according to claim 20, wherein said strip is flat and has folding zones in the form of creases, and said zig-zag shape is produced by folding along said folding zones.

23. The device according to claim 10, wherein said drawer has ends and a plurality of said catalytic flat bodies are disposed on at least one of said ends and serve as test bodies, said test bodies being removable from a complete configuration of said catalytic flat bodies in said drawer without interfering with remaining flat bodies.

24. The device according to claim 23, wherein said test bodies are metal sheets with predetermined breaking points for braking out said test bodies.

25. The device according to claim 23, wherein said support sheets of said catalyst bodies are formed of high-grade steel, and at least one of said test bodies and said flat bodies have a sheet thickness in a range between 0.04 mm and 0.07 mm.

26. The device according to claim 25, wherein said sheet thickness is 0.05 mm.

27. The device according to claim 23, wherein said test bodies for said catalytic flat bodies are formed of rectangular single sheets, and said drawer has receiving slits into which said test bodies are to be inserted like file cards.

28. The device according to claim 10, wherein said catalytic flat bodies are each formed of individual single plates being aligned next to one another in one row, said single plates are formed of rectangular single sheets, and said drawer has receiving slits into which said single sheets are to be inserted like file cards.

29. The device according to claim 23, wherein said catalyst flat bodies include said test bodies for said catalytic flat bodies and individual single plates being aligned next to one another in one row, said single plates and said test bodies are formed of rectangular single sheets, and said drawer has receiving slits into which said single plates and said test bodies are to be inserted like file cards.

30. The device according to claim 29, wherein said drawer has a frame part, and said single plates and said test bodies are to be fixed in said guide slits by elastic deformation and a mechanical strain imposed from outside upon at least said frame part of said drawer.

31. The device according to claim 1, including a fine-mesh wire grating covering said gas inlet and outlet apertures and protecting against entry of foreign bodies, substantially without hindering gas flow.

32. The device according to claim 10, including a detent or screw fastener for securing said drawer in an inserted position.

33. The device according to claim 1, including other casings, a plurality of said casings matching each other in at least two dimensions and being mounted side by side or one above the other for assembly in modular fashion in one recombiner row.

34. The device according to claim 33, wherein said casings match each other in depth and height or depth and width.

35. The device according to claim 20, wherein said zig-zag folded metal strip of said flat bodies has a fold spacing of approximately 20 mm, said flat bodies have a height in a range from approximately 100 to 200 mm, and said gas flow path has a shaft height or length inside said casing in a range between 500 and 1000 mm.

36. The device according to claim 15, wherein said single plates have a mutual spacing in a row of single plates of approximately 20 mm, said flat bodies have a height in a range from approximately 100 to 200 mm, and said gas flow path has a shaft height or length inside said casing in a range between 500 and 1000 mm.

37. The device according to claim 35, wherein said shaft height is approximately 800 mm.

38. The device according to claim 36, wherein said shaft height is approximately 800 mm.

39. A nuclear power plant, comprising:

a containment; and
a device for eliminating hydrogen being located in or forming in said containment by the recombination of hydrogen and oxygen, said device including:
catalyst bodies having surfaces and a catalytic coating on said surfaces over which a gas and vapor mixture containing hydrogen to be eliminated is to be conducted;
a casing surrounding and retaining said catalyst bodies, said casing having at least one permanently open gas inlet aperture and one permanently open gas outlet aperture, and a gas flow path in said casing through which said apertures communicate with one another, said catalyst bodies being disposed downstream of said at least one gas inlet aperture in said gas flow path in said casing;
said catalyst bodies being flat bodies formed of multi-layered sheet metal in a multi-channel configuration forming a plurality of gas flow channels connected parallel to one another, said multi-channel configuration having ends, some of said gas flow channels having channel cross sections being defined by at least an adjacent two of said flat bodies being spaced-apart, and said gas flow channels at the ends of said multi-channel configuration having channel cross sections being defined by at least one of said flat bodies; and
said flat bodies each having:
a metal support sheet,
a porous adhesion-promoting surface structure of said support sheet with a thickness of less than 10 $\mu$m.
a porous intermediate layer applied to said adhesion-promoting surface structure for increasing surface area, and
a catalyst being applied to said intermediate layer and being formed of a noble metal selected from the group consisting of platinum and palladium, said catalyst coating being distributed finely enough to preserve porosity of said intermediate layer.

40. The nuclear power plant according to claim 39, wherein said containment has a shell with a wall region and a bottom region inside said containment, a given number of fastening sites distributed in net-like fashion over at least one of said wall and bottom regions, and including other devices for eliminating hydrogen, each of said devices being mounted at a respective one of said fastening sites.

* * * * *